US009865168B2

(12) United States Patent
Naserian et al.

(10) Patent No.: US 9,865,168 B2
(45) Date of Patent: Jan. 9, 2018

(54) DETECTING MISBEHAVIOR IN VEHICLE-TO-VEHICLE (V2V) COMMINICATIONS

(71) Applicants: Hyundai America Technical Center, Inc, Superior Township, MI (US); Hyundai Motor Company, Seoul (KR); Kia Motors Corporation, Seoul (KR)

(72) Inventors: Mohammad Naserian, Windsor (CA); Allan Lewis, Windsor (CA)

(73) Assignees: Hyundai America Technical Center, Inc, Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/714,169

(22) Filed: May 15, 2015

(65) Prior Publication Data
US 2016/0335897 A1    Nov. 17, 2016

(51) Int. Cl.
G06F 11/00   (2006.01)
G08G 1/16    (2006.01)
H04W 12/10   (2009.01)
H04W 4/00    (2009.01)
H04W 4/04    (2009.01)
H04W 12/12   (2009.01)
H04L 29/06   (2006.01)

(52) U.S. Cl.
CPC .......... *G08G 1/161* (2013.01); *H04L 63/126* (2013.01); *H04W 4/008* (2013.01); *H04W 4/046* (2013.01); *H04W 12/10* (2013.01); *H04W 12/12* (2013.01)

(58) Field of Classification Search
CPC ...................................................... G08G 1/161
USPC ........................................................... 726/22
See application file for complete search history.

(56) References Cited

U.S. PATENT DOCUMENTS 3,274,591 A * 9/1966 Chambers ........... G01S 13/5242
                                                      342/161
4,499,467 A * 2/1985 Rittenbach .............. G01S 13/62
                                                      342/109

(Continued)

FOREIGN PATENT DOCUMENTS

CN           103383820      11/2013
JP           5542618 B2      7/2014

(Continued)

*Primary Examiner* — Peter Shaw
(74) *Attorney, Agent, or Firm* — Mintz Levin Cohn Ferris Glovsky and Popeo, P.C.; Peter F. Corless

(57) ABSTRACT

A method includes: receiving, at a host vehicle, a plurality of messages transmitted using Vehicle-to-Vehicle (V2V) communications indicating a heading angle and a speed of a remote vehicle; calculating an expected change in frequency of the plurality of messages received at the host vehicle based on the heading angle and the speed of the remote vehicle; measuring an actual change in frequency of the plurality of messages received at the host vehicle due to the Doppler effect; comparing the expected change in frequency to the actual change in frequency; and determining that the plurality of messages were not transmitted from the remote vehicle when a difference between the expected change in frequency and the actual change in frequency exceeds a predefined frequency change threshold.

10 Claims, 7 Drawing Sheets

(56) References Cited

U.S. PATENT DOCUMENTS

| | | | |
|---|---|---|---|
| 4,740,045 A * | 4/1988 | Goodson | G01S 7/023 342/112 |
| 5,371,718 A * | 12/1994 | Ikeda | B60T 8/172 342/104 |
| 8,819,414 B2 | 8/2014 | Bellur et al. | |
| 2007/0043539 A1* | 2/2007 | Niina | G05B 23/0245 702/188 |
| 2010/0245171 A1* | 9/2010 | Zeng | G01S 5/0072 342/357.34 |
| 2011/0140968 A1* | 6/2011 | Bai | G01S 5/0072 342/454 |
| 2011/0214178 A1* | 9/2011 | van den Berg | H04L 63/20 726/22 |
| 2011/0238997 A1 | 9/2011 | Bellur et al. | |
| 2013/0297195 A1 | 11/2013 | Das et al. | |
| 2015/0200957 A1* | 7/2015 | Zhang | B60W 30/09 726/22 |

FOREIGN PATENT DOCUMENTS

| | | |
|---|---|---|
| KR | 10-2004-0048051 A | 6/2004 |
| KR | 10-2012-0024230 | 3/2012 |
| KR | 10-1117168 | 3/2012 |
| KR | 10-2014-0066358 A | 6/2014 |
| KR | 10-2015-0050114 A | 5/2015 |

* cited by examiner

| BSM Part I | BSM Part II |
|---|---|
| Message sequence number | Event flags |
| Vehicle Temp ID | Path History |
| Time Stamp | Path Prediction |
| Position: Latitude, Longitude, accuracy | Relative positioning RTCM |
| Speed and Transmission state | |
| Heading | |
| Steering Angle | |
| Acceleration and Yaw Rate | |
| Brake Status | |
| Vehicle length and width | |
| ABS Active | |
| Stability Control Active | |
| Longitudinal Accelerometer | |

FIG. 2

DETECTING MISBEHAVIOR IN VEHICLE-TO-VEHICLE (V2V) COMMINICATIONS

BACKGROUND (a) Technical Field

The present disclosure relates generally to automotive communication systems, and more particularly, to detecting misbehavior in Vehicle-to-Vehicle (V2V) communications.

(b) Background Art

For more than a decade, the United States Department of Transportation and National Highway Traffic Safety Administration have been conducting research on Vehicle-to-Vehicle (V2V) communications as a system for transmitting basic safety information between vehicles to facilitate warnings to drivers concerning impending crashes. V2V communications, or simply V2V, involves a dynamic wireless exchange of data between nearby vehicles offering the opportunity for significant safety improvements. V2V uses on-board dedicated short-range communication (DSRC) radio devices to transmit messages about a vehicle's speed, heading, brake status, and other information to other vehicles and receive the same messages from other vehicles. These messages, known as Basic Safety Messages (BSMs), can be derived using non-vehicle-based technologies such as global positioning system (GPS) to detect a location and speed of a vehicle, or using vehicle-based sensor data where the location and speed data is derived from the vehicle's on-board computer. The vehicle-based sensor data can be combined with other data, such as latitude, longitude, and angle, to produce a richer, more detailed situational awareness of the position of other vehicles. Accordingly, exchanging messages with other vehicles using V2V enables a vehicle to automatically sense the position of surrounding vehicles with 360-degree awareness as well as the potential hazard they present, calculate risk based on the position, speed, or trajectory of surrounding vehicles, issue driver advisories or warnings, and take pre-emptive actions to avoid and mitigate crashes. Government agencies and automobile manufacturers, alike, are working toward widespread adoption of V2V, such that each vehicle on the roadway (e.g., cars, trucks, buses, motorcycles, etc.) is eventually able to communicate with other vehicles using V2V.

V2V technology opens the door to myriad benefits of an Intelligent Transportation System. However, with increased interconnectivity, there is greater risk of harm in the case of a security breach. In the event that an attacker is able to circumvent a basic level of security that is currently implemented in V2V systems, severe disruptions to traffic could be caused. For instance, an attacker may be capable of replicating another vehicle's authenticity certificate, e.g., by acquiring a DSRC radio from an old or damaged vehicle. In such a case, the attacker could emulate a vehicle on the roadway that is not actually present, potentially forcing other vehicles to automatically stop or swerve to avoid a perceived collision. Therefore, an additional layer of security is needed to prevent malicious attackers from breaching current V2V security measures and emulating virtual vehicles.

SUMMARY OF THE DISCLOSURE

The present disclosure provides an additional level of security in V2V communications that can supplement existing V2V security measures. In this regard, the techniques disclosed herein can deter attackers from successfully emulating a virtual vehicle and thereby causing severe disruptions to traffic and vehicular accidents. A vehicle (e.g., "host vehicle") receiving BSMs from a remote entity using V2V communications can utilize the Doppler effect to validate the source of the received messages based on the Doppler shift in the carrier frequency. The host vehicle can further utilize the Doppler effect to validate the source of the received messages based on the angular offset of the host vehicle with respect to the source.

According to embodiments of the present disclosure, a method includes: receiving, at a host vehicle, a plurality of messages transmitted using Vehicle-to-Vehicle (V2V) communications indicating a heading angle and a speed of a remote vehicle; calculating an expected change in frequency of the plurality of messages received at the host vehicle based on the heading angle and the speed of the remote vehicle; measuring an actual change in frequency of the plurality of messages received at the host vehicle due to the Doppler effect; comparing the expected change in frequency to the actual change in frequency; and determining that the plurality of messages were not transmitted from the remote vehicle when a difference between the expected change in frequency and the actual change in frequency exceeds a predefined frequency change threshold.

The method may further include: counting a number of times that the difference between the expected change in frequency and the actual change in frequency exceeds the predefined frequency change threshold; and determining whether the number of times exceeds a predefined event threshold.

The method may further include: calibrating one or more of the frequency change threshold and the number of times threshold.

The method may further include: determining a heading angle and a speed of the host vehicle.

The expected change in frequency may be calculated based on the heading angle and the speed of the remote vehicle and the heading angle and the speed of the host vehicle.

The expected change in frequency may be calculated according to the following formula:

$$\Delta f_{Calculated} = \frac{f}{c}|V_{RV} - V_{HV}| \cdot \text{Cos}(H_{RV} - H_{HV}),$$

where $\Delta f_{calculated}$ is the calculated expected change in frequency, f is a frequency of the plurality of messages received at the host vehicle, c is the speed of light, $V_{RV}$ is the speed of the remote vehicle, $V_{HV}$ is the speed of the host vehicle, $H_{RV}$ is the heading angle of the remote vehicle, and $H_{HV}$ is the heading angle of the host vehicle.

The method may further include: reporting that the plurality of messages were not transmitted from the remote vehicle.

The method may further include: determining that the remote vehicle is a virtual vehicle emulated by a remote attacker.

The plurality of messages may be Basic Safety Messages (BSMs).

Furthermore, according to embodiments of the present disclosure, a method includes: receiving, at a host vehicle, a plurality of messages transmitted using Vehicle-to-Vehicle (V2V) communications indicating a heading angle and a speed of a remote vehicle; calculating an expected angular offset of the plurality of messages received at the host vehicle based on the heading angle of the remote vehicle; measuring an actual angular offset of the plurality of messages received at the host vehicle; comparing the expected angular offset to the actual angular offset; and determining that the plurality of messages were not transmitted from the remote vehicle when a difference between the expected angular offset and the actual angular offset exceeds a predefined angular offset threshold.

The method may further include: counting a number of times that the difference between the expected angular offset and the actual angular offset exceeds the predefined angular offset threshold; and determining whether the number of times exceeds a predefined event threshold.

The method may further include: calibrating one or more of the angular offset threshold and the number of times threshold.

The method may further include: determining a heading angle and a speed of the host vehicle.

The expected angular offset may be calculated based on the heading angle of the remote vehicle and the heading angle of the host vehicle, and the actual angular offset may be measured based on based on a change in frequency of the plurality of messages received at the host vehicle due to the Doppler effect, the speed of the remote vehicle, and the speed of the host vehicle.

The expected angular offset may be calculated according to the following formula:

$$\theta_{Calculated} = H_{RV} - H_{HV},$$

where $\theta_{calculated}$ is the calculated expected angular offset, $H_{RV}$ is the heading angle of the remote vehicle, and $H_{HV}$ is the heading angle of the host vehicle.

The actual angular offset may be measured according to the following formula:

$$\theta_{Measured} = \cos^{-1}\left(\frac{c}{f} \frac{\Delta f_{measured}}{|V_{RV} - V_{HV}|}\right),$$

where $\theta_{measured}$ is the measured actual angular offset, f is a frequency of the plurality of messages received at the host vehicle, c is the speed of light, $\Delta f_{measured}$ is a measured change in frequency of the plurality of messages received at the host vehicle, $V_{RV}$ is the speed of the remote vehicle, and $V_{HV}$ is the speed of the host vehicle.

The method may further include: reporting that the plurality of messages were not transmitted from the remote vehicle.

The method may further include: determining that the remote vehicle is a virtual vehicle emulated by a remote attacker.

The plurality of messages may be Basic Safety Messages (BSMs).

Furthermore, according to embodiments of the present disclosure, a method includes: receiving, at a host vehicle, a plurality of messages transmitted using Vehicle-to-Vehicle (V2V) communication indicating a heading angle and a speed of a remote vehicle; calculating an expected change in frequency of the plurality of messages received at the host vehicle based on the heading angle and the speed of the remote vehicle; measuring an actual change in frequency of the plurality of messages received at the host vehicle due to the Doppler effect; comparing the expected change in frequency to the actual change in frequency; calculating an expected angular offset of the plurality of messages received at the host vehicle based on the heading angle of the remote vehicle; measuring an actual angular offset of the plurality of messages received at the host vehicle; comparing the expected angular offset to the actual angular offset; and determining that the plurality of messages were not transmitted from the remote vehicle when a difference between the expected change in frequency and the actual change in frequency exceeds a predefined frequency change threshold or when a difference between the expected angular offset and the actual angular offset exceeds a predefined angular offset threshold.

Furthermore, according to embodiments of the present disclosure, a non-transitory computer readable medium containing program instructions for performing a method includes: program instructions that receive, at a host vehicle, a plurality of messages transmitted using Vehicle-to-Vehicle (V2V) communications indicating a heading angle and a speed of the remote vehicle; program instructions that calculate an expected change in frequency of the plurality of messages received at the host vehicle based on the heading angle and the speed of the remote vehicle; program instructions that measure an actual change in frequency of the plurality of messages received at the host vehicle due to the Doppler effect; program instructions that compare the expected change in frequency to the actual change in frequency; and program instructions that determine that the plurality of messages were not transmitted from the remote vehicle when a difference between the expected change in frequency and the actual change in frequency exceeds a predefined frequency change threshold.

Furthermore, according to embodiments of the present disclosure, a non-transitory computer readable medium containing program instructions for performing a method includes: program instructions that receive, at a host vehicle, a plurality of messages transmitted using Vehicle-to-Vehicle (V2V) communications indicating a heading angle and a speed of the remote vehicle; program instructions that calculate an expected angular offset of the plurality of messages received at the host vehicle based on the heading angle of the remote vehicle; program instructions that measure an actual angular offset of the plurality of messages received at the host vehicle; program instructions that compare the expected angular offset to the actual angular offset; and program instructions that determine that the plurality of messages were not transmitted from the remote vehicle when a difference between the expected angular offset and the actual angular offset exceeds a predefined angular offset threshold.

Furthermore, according to embodiments of the present disclosure, a non-transitory computer readable medium containing program instructions for performing a method includes: program instructions that receive, at a host vehicle, a plurality of messages transmitted using Vehicle-to-Vehicle (V2V) communications indicating a heading angle and a speed of the remote vehicle; program instructions that calculate an expected change in frequency of the plurality of messages received at the host vehicle based on the heading angle and the speed of the remote vehicle; program instructions that measure an actual change in frequency of the plurality of messages received at the host vehicle due to the Doppler effect; program instructions that compare the expected change in frequency to the actual change in frequency; program instructions that calculate an expected angular offset of the plurality of messages received at the host vehicle based on the heading angle of the remote vehicle; program instructions that measure an actual angular offset of the plurality of messages received at the host vehicle; program instructions that compare the expected angular offset to the actual angular offset; and program instructions that determine that the plurality of messages were not transmitted from the remote vehicle when a difference between the expected change in frequency and the actual change in frequency exceeds a predefined frequency change threshold or when a difference between the expected angular offset and the actual angular offset exceeds a predefined angular offset threshold.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 2 illustrates an example basic safety message (BSM) construction;

Figure 1A:
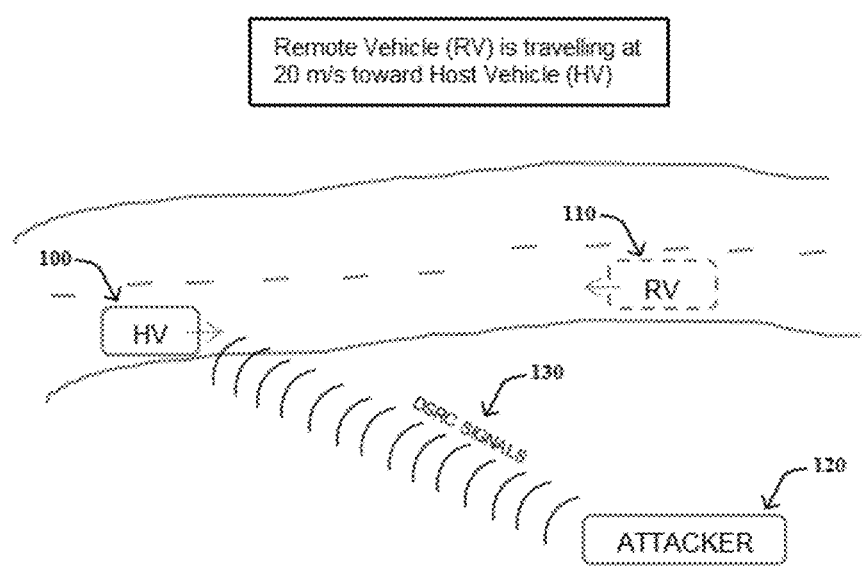
FIGS. 1A-1C illustrate example security breach scenarios in V2V communications.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one controller or controller area network (CAN) bus. The controller or controller area network (CAN) bus may be implemented in a vehicle, such as the host vehicle described herein. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller in conjunction with one or more additional components, as described in detail below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to embodiments of the present disclosure, the disclosed techniques deter attackers from successfully emulating a virtual vehicle and thereby causing severe disruptions to traffic and vehicular accidents. A vehicle (e.g., "host vehicle") receiving BSMs from a remote entity using V2V communications can utilize the Doppler effect to validate the source of the received messages based on the Doppler shift in the carrier frequency. The host vehicle can further utilize the Doppler effect to validate the source of the received messages based on the angular offset of the host vehicle with respect to the source.

Figure 1B:
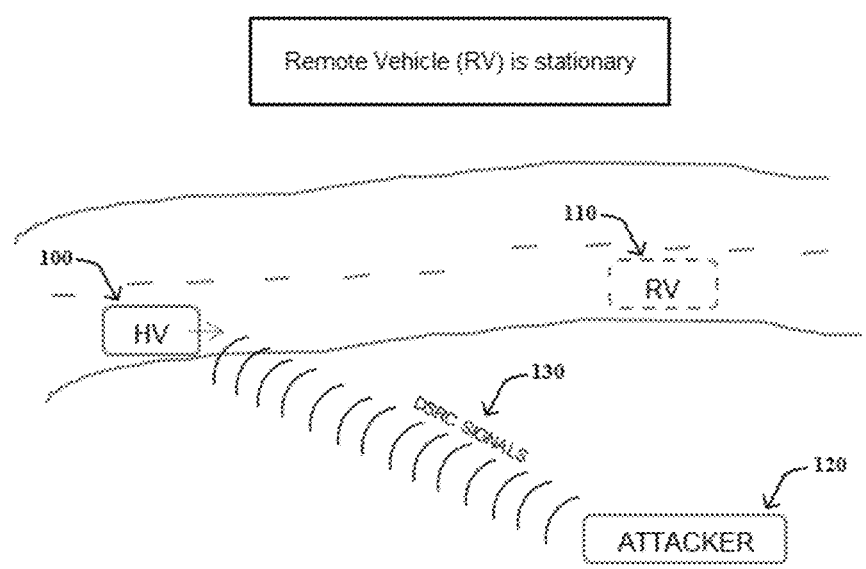
Figure 1C:
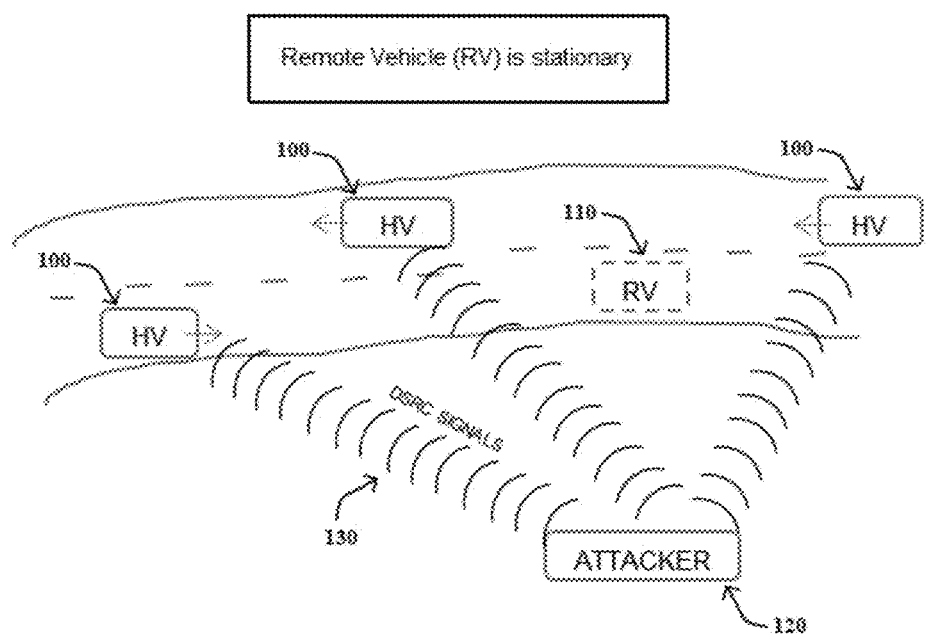

FIGS. 1A-1C illustrate example security breach scenarios in V2V communications. As shown in FIGS. 1A-1C, a host vehicle (HV) 100 traveling on a roadway may be V2V communications-enabled, allowing the vehicle 100 to transmit messages (e.g., BSMs) to other vehicles including various informational data (e.g., vehicle's location, speed, heading, brake status, etc.) and receive the same messages from other vehicles. As such, the host vehicle 100 may receive a plurality of messages 130 (e.g., BSMs) transmitted using V2V communications from a remote source. The messages 130 may be signals sent from a DSRC radio, for example.

An example BSM construction is illustrated in FIG. 2. The BSM is optimal for low latency, localized broadcast required by V2V safety applications. As such, BSMs are transmitted over DSRC having a range of approximately 1,000 meters. As shown in FIG. 2, an example BSM consists of two parts: BSM Part I and BSM Part II. BSM Part I contains the core data elements (e.g., vehicle size, position, speed, heading angle, acceleration, brake system status, etc.). The BSM Part 1 is typically transmitted approximately 10 times per second. Meanwhile, BSM Part II contains a variable set of data elements drawn from various optional data elements. BSM Part II can sometimes be added to Part I depending on recent events (e.g., anti-lock braking system activation, ambient temperature/air pressure, weather information, exterior lights status, etc.). Notably, as BSM construction continues to evolve, the BSMs being exchanged between vehicles, such as the host vehicle 100 and remote vehicle 110, may contain any suitable configuration of informational data. Thus, the data types depicted in FIG. 2 are for demonstration purposes only and should not be treated as limiting the scope of the present claims.

The received messages 130 may indicate the presence of a remote vehicle (RV) 110 traveling on the same roadway as the host vehicle 100. The messages 130 may indicate various informational data regarding the remote vehicle 110, such as speed, heading angle, location, brake status, and the like. Typically, the host vehicle 100 can automatically initiate actions to promote safety in response to information regarding the remote vehicle 110. For instance, if the messages 130 indicate that the remote vehicle 110 is rapidly approaching the host vehicle 100 head-on, based on the speed and heading angle of the remote vehicle 110, the host vehicle 100 can issue driver advisories or warnings, or even take pre-emptive actions to avoid and mitigate a potential crash, such as turning or stopping the vehicle.

However, as shown in FIGS. 1A-1C, the plurality of messages 130 may actually be transmitted from a remote attacker 120, meaning the remote vehicle 110 does not actually exist. Rather, the remote attacker 120 is emulating the remote vehicle 110 by sending the messages 130 using V2V communications indicating an artificial presence of the remote vehicle 110. That is, the plurality of messages 130 received by the host vehicle 100 appear to be transmitted from a remote vehicle 110, based on the information in the messages 130. In reality though, the messages 130 are sent from a remote attacker 120 pretending to be the remote vehicle 110.

In one example, the attacker 120 may be positioned on the side of the roadway on which the host vehicle 100 is travelling (likely with other vehicles). The attacker 120 may have acquired a DSRC radio from an old or damaged vehicle (e.g., in a salvage yard, black market, etc.) that is pre-loaded with valid V2V certificates. Thus, the attacker 120 can send DSRC signals using the DSRC radio and effectively communicate with vehicles passing by. Notably, in order to ensure that the host vehicle 100 receives the messages 130, the attacker 120 has to accurately direct the messages 130 toward the host vehicle 100, e.g., using a directional antenna. This becomes increasingly more difficult for the attacker 120 when multiple vehicles are traveling on the roadway.

Referring now to FIG. 1A, the messages 130 received at the host vehicle 100 may indicate that a remote vehicle 110 is traveling at 20 m/s toward the host vehicle 100. Meanwhile, in FIG. 1B, the messages 130 received at the host vehicle 100 may indicate that the remote vehicle 110 is stationary but located ahead of the host vehicle 100. It should be noted that the attacker 120 is located in the same position in both scenarios (i.e., the attacker 120 is stationary). Thus, the angle at which the messages 130 are received at the host vehicle 100 is the same in both scenarios. A scenario similar to that of FIG. 1B is shown in FIG. 1C, except that multiple host vehicles 100 are traveling on the roadway, and the attacker 120 attempts to transmit messages 130 using V2V communications to each of the host vehicles.

In each scenario shown in FIGS. 1A-1C, the messages 130 indicate a speed and a heading angle of the remote vehicle 110, along with other informational data such as location, vehicle type, brake status, etc.

Figure 3A:
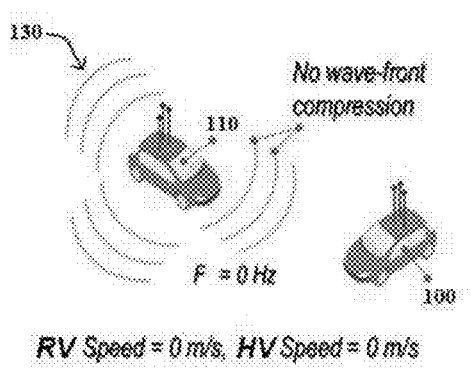
FIGS. 3A and 3B illustrate an example demonstration of the Doppler effect in messages sent between two vehicles.
Figure 3B:
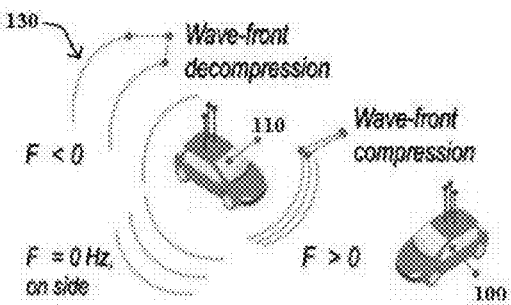

In response to receiving the plurality of messages 130 transmitted from the attacker 120 using V2V communications, the host vehicle 100 can utilize the Doppler effect to validate the source from which the messages 130 are transmitted. In this regard, the Doppler effect (or Doppler shift) is the change in frequency of a wave (or other periodic event) for an observer moving relative to its source. FIGS. 3A and 3B illustrate an example demonstration of the Doppler effect in messages sent between two vehicles. Similar to the scenarios depicted in FIGS. 1A-1C, a remote vehicle 110 transmits a plurality of messages 130 using V2V communications to surrounding vehicles including the host vehicle 100 (though, in FIGS. 1A-1C, the remote vehicle 110 is actually emulated by the attacker 120). In FIG. 3A, both of the remote vehicle 110 and host vehicle 100 are stationary. Because of this, there is no compression (or decompression) of the signals 130 being transmitted. Therefore, there is no perceived change in the frequency of the messages 130 received at the host vehicle 100.

However, when the source of the waves is moving toward the observer, each successive wave crest is emitted from a position closer to the observer than the previous wave. Therefore, each wave takes slightly less time to reach the observer than the previous wave. Hence, the time between the arrival of successive wave crests at the observer is reduced, causing an increase in the frequency. This scenario is demonstrated in FIG. 3B, where the remote vehicle 110 is traveling toward the host vehicle 100 while transmitting the messages 130. As shown in FIG. 3B, due to the movement of the remote vehicle 110, the distance between successive wave fronts is reduced, so the waves compress. Conversely, if the source of waves is moving away from the observer, each wave is emitted from a position farther from the observer than the previous wave, so the arrival time between successive waves is increased, reducing the frequency. The distance between successive wave fronts is then increased, so the waves decompress.

Accordingly, when a wave source (e.g., remote vehicle 110) and a receiver (e.g., the host vehicle 100) are moving relative to one another, the frequency of the received signals will not be the same as the frequency emitted from the source. When they are moving towards each other, the frequency of the observed signal is higher than the frequency emitted at the source. This phenomenon is known as the Doppler effect. The rate of frequency change due to the Doppler effect depends on the relative motion between the source and receiver and on the speed of propagation of the wave. The Doppler shift in frequency can be calculated according to the following formula:

$$F_D = \Delta f = \pm fc \frac{V}{c} \cos\beta,$$

where $F_D$ and $\Delta f$ is the change in frequency (i.e., frequency shift) of the source observed at the receiver, fc is the frequency at the source, V is the speed difference (i.e., relative velocity) between the source and transmitter, c is the speed of light, and $\beta$ is the angle of the velocity vector. The change in frequency is maximized when $\beta=0$ (i.e., when the source and receiver are moving in the same or opposite direction). Similarly, as the relative velocity between the source and receiver increases, so does the change in frequency.

As stated above, the host vehicle 100 can utilize the Doppler effect to validate the source from which the messages 130 are transmitted by comparing the measured frequency shift to the expected frequency shift. Particularly, the host vehicle 100 may: 1) measure the actual change in frequency of the messages 130 received at the host vehicle 100 resulting from the Doppler effect, 2) calculate the expected change in frequency of the messages 130 received at the host vehicle 100 based on information about the remote vehicle 110 that is indicated in the messages 130, and 3) compare the actual change in frequency of the received messages 130 to the expected change in frequency of the received messages 130. If the difference between the actual change in frequency and the expected change in frequency exceeds a predefined frequency change threshold, the host vehicle 100 may determine that V2V misbehavior has occurred. That is, the messages 130 received at the host vehicle 100 were not actually sent from the remote vehicle 110. As a result, the host vehicle 100 can elect to forgo any attempt to mitigate an accident or collision involving the remote vehicle 110, disregard the received messages 130, report the detected V2V misbehavior (e.g., by sending a reporting message to a V2V communications server), and so forth.

Figure 4:
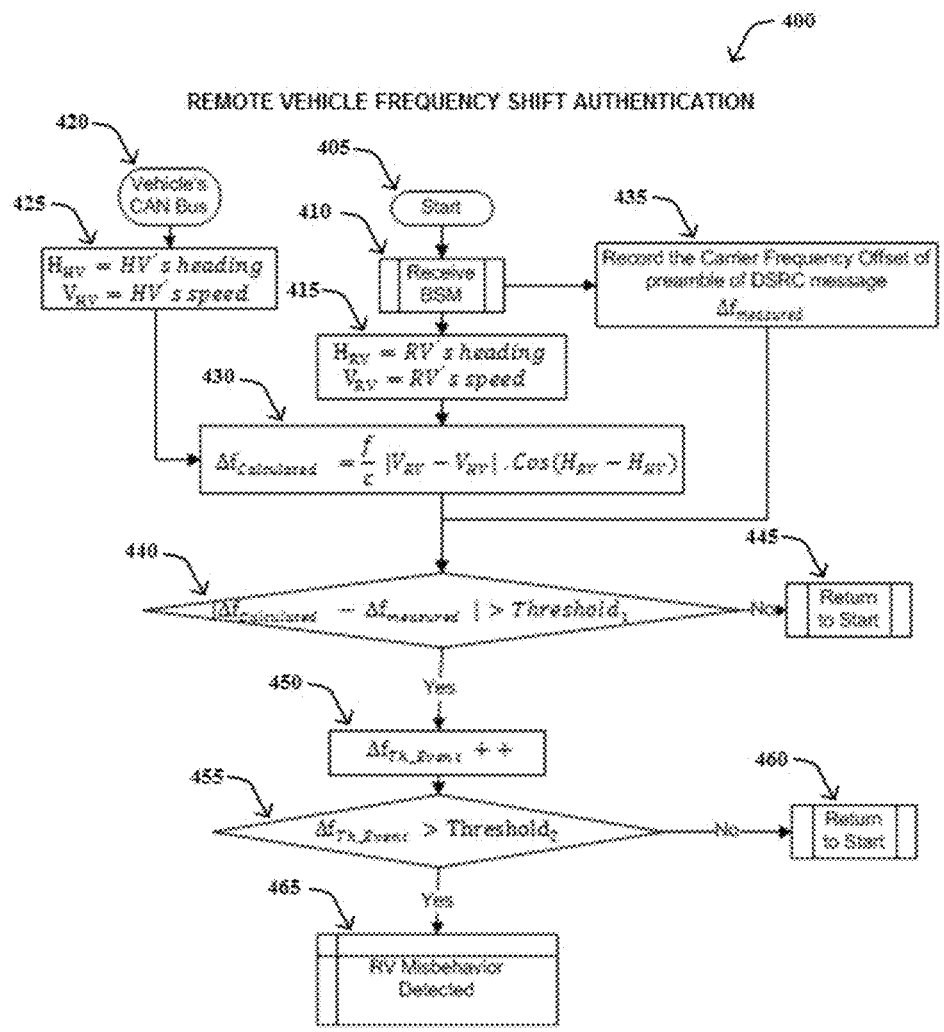
FIG. 4 illustrates an example simplified procedure for performing remote vehicle frequency shift authentication.

FIG. 4 illustrates an example simplified procedure for performing remote vehicle frequency shift authentication. The procedure 400 may start at step 405, and continue to step 410, where, as described in greater detail herein, the Doppler effect can be utilized to validate the source from which the messages 130 are transmitted by comparing the measured frequency shift to the expected frequency shift.

At step 410, a plurality of messages 130 (e.g., BSMs) are received at the host vehicle 100. The messages 130 may include various informational data about a remote vehicle 110, such as the remote vehicle's heading angle ($H_{RV}$) and the remote vehicle's speed ($V_{RV}$) (step 415). Additional informational data typically included in the messages 130 is set forth in FIG. 2. At steps 420 and 425, the host vehicle 100, or more specifically, a controller/controller area network (CAN) bus of the host vehicle 100, can determine its own heading angle ($H_{HV}$) and speed ($V_{HV}$). Based on this information (i.e., the heading angle and speed of the remote vehicle 110 and the heading angle and speed of the host vehicle 100), the expected change in frequency (or frequency shift) of the messages 130 received at the host vehicle 100 can be calculated ($\Delta f_{Calculated}$), at step 430. In particular, the expected change in frequency can be calculated according to the following formula:

$$\Delta f_{Calculated} = \frac{f}{c}|V_{RV} - V_{HV}| \cdot \cos(H_{RV} - H_{HV}),$$

where $\Delta f_{calculated}$ is the calculated expected change in frequency, f is the frequency of the messages 130 received at the host vehicle 100, c is the speed of light, $V_{RV}$ is the speed of the remote vehicle 110, $V_{HV}$ is the speed of the host vehicle 100, $H_{RV}$ is the heading angle of the remote vehicle 110, and $H_{HV}$ is the heading angle of the host vehicle 100.

Meanwhile, at step 435, the actual change in carrier frequency of the messages 130 received at the host vehicle 100 due to the Doppler effect can be measured ($\Delta f_{Measured}$).

For instance, the host vehicle 100 can record the carrier frequency offset of the preamble of the received messages 130. Then, at step 440, the host vehicle 100 may compare the calculated change in frequency of the received messages 130 ($\Delta f_{Calculated}$) to the measured change in frequency of the received messages 130 ($\Delta f_{Measured}$) by computing a difference between the calculated change in frequency and the measured change in frequency and comparing the difference to a predefined frequency change threshold. The frequency change threshold may be adjusted or calibrated, as desired, such that the remote vehicle frequency shift authentication is more or less sensitive. If the difference between the calculated change in frequency and the measured change in frequency is less than or equal to the frequency change threshold, the procedure 400 may return to step 405, and the host vehicle 100 may assume that the remote vehicle 110 indicated in the received messages 130 is actually transmitting the messages to the host vehicle 100 (step 445). However, if the difference between the calculated change in frequency and the measured change in frequency exceeds the frequency change threshold, the host vehicle 100 may determine that V2V misbehavior has occurred (step 465). That is, the plurality of messages 130 were not transmitted from the remote vehicle 110, and rather, the messages 130 were sent from a remote attacker (e.g., attacker 120) emulating the remote vehicle 110.

Notably, optional steps 450, 455 and 460 may be incorporated into the remote vehicle frequency shift authentication procedure if a single occurrence of frequency shift discrepancy is insufficient to conclude that V2V misbehavior has occurred. In this regard, an event counter ($\Delta f_{Th\_Event}$) may be incremented, at step 450, in order to track the number of times that the difference between the calculated change in frequency and the measured change in frequency exceeds the frequency change threshold. Then, at step 455, it can be determined whether the event counter (i.e., the number of times that the difference exceeds the frequency change threshold) exceeds a predefined event threshold. Similar to the frequency change threshold, the event threshold may be adjusted or calibrated, as desired, such that the remote vehicle frequency shift authentication is more or less sensitive. If the event counter is less than or equal to the event threshold, the procedure 400 may return to step 405, and the host vehicle 100 may repeat the remote vehicle frequency shift authentication to perform additional testing of the frequency shift (step 460). However, if the event counter exceeds the event threshold, the host vehicle 100 may determine that V2V misbehavior has occurred (step 465).

The procedure 400 illustratively ends at step 465. The techniques by which the steps of procedure 400 may be performed, as well as ancillary procedures and parameters, are described in detail above.

It should be noted that the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

In addition, the host vehicle 100 can utilize the Doppler effect to validate the source from which the messages 130 are transmitted by calculating an angular difference between the transmission points of the expected remote vehicle 110 and the actual location of the messages 130 coming from the attacker 120 (illustratively located on the side of the roadway). To this end, the host vehicle 100 may compute the angular offset (i.e., the angle of the velocity vector (β)) of the received messages 130, which represents the angle of the location of the source (either the perceived remote vehicle 110 or the attacker 120) with respect to the host vehicle 100. Particularly, the host vehicle 100 may: 1) measure the actual angular offset of the messages 130 received at the host vehicle 100 resulting from the Doppler effect, 2) calculate the expected angular offset of the messages 130 received at the host vehicle 100 based on information about the remote vehicle 110 that is indicated in the messages 130, and 3) compare the actual angular offset of the received messages 130 to the expected angular offset of the received messages 130. If the difference between the actual angular offset and the expected angular offset exceeds a predefined angular offset threshold, the host vehicle 100 may determine that V2V misbehavior has occurred. That is, the messages 130 received at the host vehicle 100 were not actually sent from the remote vehicle 110. As a result, the host vehicle 100 can elect to forgo any attempt to mitigate an accident or collision involving the remote vehicle 110, disregard the received messages 130, report the detected V2V misbehavior (e.g., by sending a reporting message to a V2V communications server), and so forth.

Figure 5:
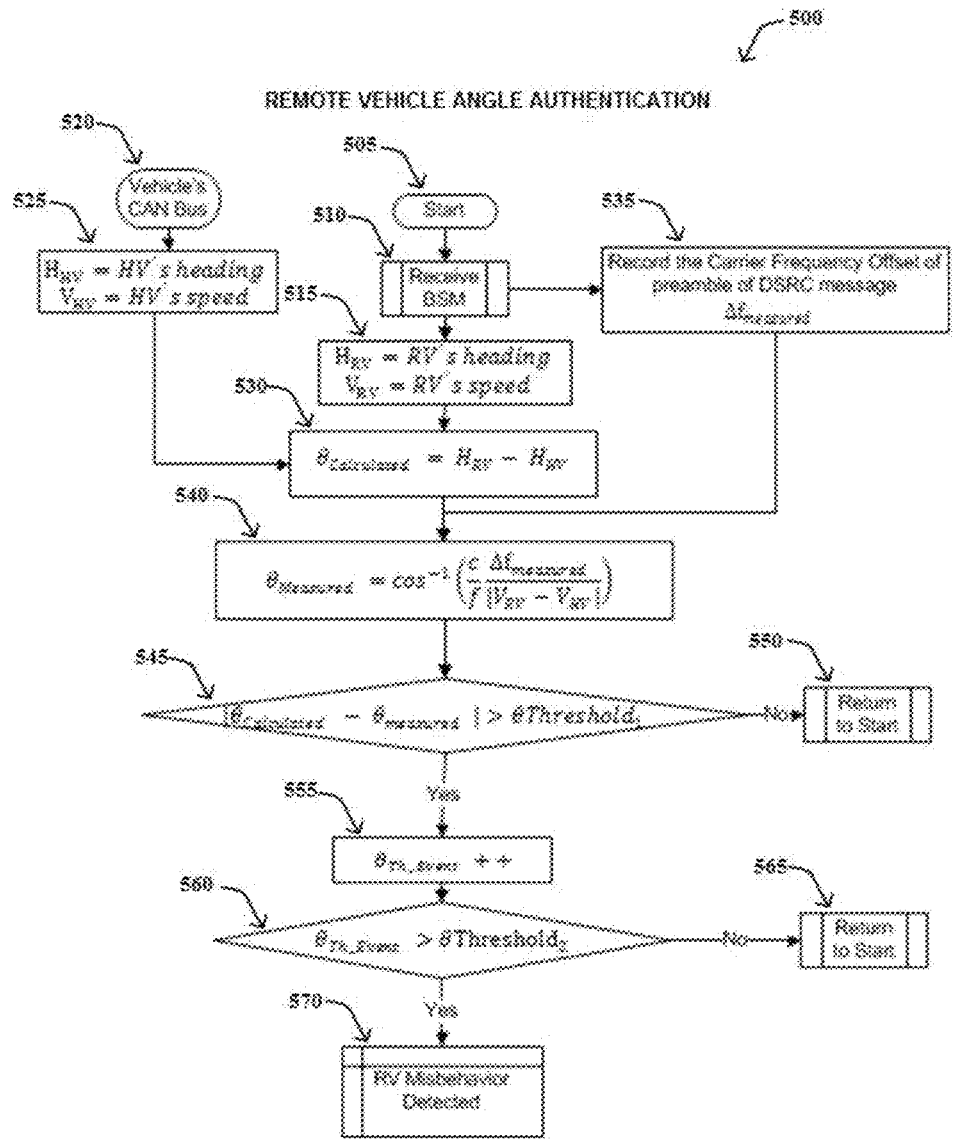
FIG. 5 illustrates an example simplified procedure for performing remote vehicle angle authentication.

FIG. 5 illustrates an example simplified procedure for performing remote vehicle angle authentication. The procedure 500 may start at step 505, and continue to step 510, where, as described in greater detail herein, the Doppler effect can be utilized to validate the source from which the messages 130 are transmitted by calculating an angular difference between the transmission points of the expected remote vehicle 110 and the actual location of the messages 130 coming from the attacker 120. The remote vehicle angle authentication process is similar to the remote vehicle frequency shift authentication depicted in FIG. 4. The inputs are identical to the remote vehicle frequency shift authentication, and formulas used in the remote vehicle angle authentication are similar to those used in the remote vehicle frequency shift authentication, except rearranged to make a comparison in terms of an angle.

At step 510, a plurality of messages 130 (e.g., BSMs) are received at the host vehicle 100. The messages 130 may include various informational data about a remote vehicle 110, such as the remote vehicle's heading angle ($H_{RV}$) and the remote vehicle's speed ($V_{RV}$) (step 515). At steps 520 and 525, the host vehicle 100, or more specifically, a controller/controller area network (CAN) bus of the host vehicle 100, can determine its own heading angle ($H_{HV}$) and speed ($V_{HV}$). Based on this information (i.e., the heading angle of the remote vehicle 110 and the heading angle of the host vehicle 100), the expected angular offset of the messages 130 received at the host vehicle 100 can be calculated ($\theta_{Calculated}$), at step 530. In particular, the expected angular offset can be calculated according to the following formula:

$$\theta_{Calculated} = H_{RV} - H_{HV},$$

where $\theta_{calculated}$ is the calculated expected angular offset, $H_{RV}$ is the heading angle of the remote vehicle, and $H_{HV}$ is the heading angle of the host vehicle.

Meanwhile, at step 535, the actual change in carrier frequency of the messages 130 received at the host vehicle 100 due to the Doppler effect can be measured ($\Delta f_{Measured}$). For instance, the host vehicle 100 can record the carrier frequency offset of the preamble of the received messages 130. Then, at step 540, the host vehicle 100 may measure the actual angular offset of the plurality of messages 130 received at the host vehicle 100 resulting from the Doppler effect. The actual angular offset ($\theta_{Measured}$) may be measured based on the change in frequency of the messages 130 received at the host vehicle 100 due to the Doppler effect (determined at step 535), the speed of the remote vehicle 110, and the speed of the host vehicle 100. In particular, the actual angular offset can be measured according to the following formula:

$$\theta_{Measured} = \cos^{-1}\left(\frac{c}{f} \frac{\Delta f_{measured}}{|V_{RV} - V_{HV}|}\right),$$

where $\theta_{measured}$ is the measured actual angular offset, f is the frequency of the plurality of messages 130 received at the host vehicle 100, c is the speed of light, $\Delta f_{measured}$ is the measured change in frequency (frequency shift) of the plurality of messages 130 received at the host vehicle 100, $V_{RV}$ is the speed of the remote vehicle 110, and $V_{HV}$ is the speed of the host vehicle 100.

Then, at step 545, the host vehicle 100 may compare the calculated angular offset of the received messages 130 ($\theta_{Calculated}$) to the measured angular offset of the received messages 130 ($\theta_{Measured}$) by computing a difference between the calculated angular offset and the measured angular offset and comparing the difference to a predefined angular offset threshold. The angular offset threshold may be adjusted or calibrated, as desired, such that the remote vehicle angle authentication is more or less sensitive. If the difference between the calculated angular offset and the measured angular offset is less than or equal to the angular offset threshold, the procedure 500 may return to step 505, and the host vehicle 100 may assume that the remote vehicle 110 indicated in the received messages 130 is actually transmitting the messages to the host vehicle 100 (step 550). However, if the difference between the calculated angular offset and the measured angular offset exceeds the angular offset threshold, the host vehicle 100 may determine that V2V misbehavior has occurred (step 570). That is, the plurality of messages 130 were not transmitted from the remote vehicle 110, and rather, the messages 130 were sent from a remote attacker (e.g., attacker 120) emulating the remote vehicle 110.

Notably, optional steps 555, 560 and 565 may be incorporated into the remote vehicle angular offset authentication procedure if a single occurrence of angular discrepancy is insufficient to conclude that V2V misbehavior has occurred. In this regard, an event counter ($\Delta f_{Th\_Event}$) may be incremented, at step 555, in order to track the number of times that the difference between the calculated angular offset and the measured angular offset exceeds the angular offset threshold. Then, at step 560, it can be determined whether the event counter (i.e., the number of times that the difference exceeds the angular offset threshold) exceeds a predefined event threshold. Similar to the angular offset threshold, the event threshold may be adjusted or calibrated, as desired, such that the remote vehicle angle authentication is more or less sensitive. If the event counter is less than or equal to the event threshold, the procedure 500 may return to step 505, and the host vehicle 100 may repeat the remote vehicle angle authentication to perform additional testing of the angular offset (step 565). However, if the event counter exceeds the event threshold, the host vehicle 100 may determine that V2V misbehavior has occurred (step 570).

The procedure 500 illustratively ends at step 570. The techniques by which the steps of procedure 500 may be performed, as well as ancillary procedures and parameters, are described in detail above.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Referring back to the security breach scenarios in V2V communications depicted in FIGS. 1A-1C, one of the remote vehicle frequency shift authentication procedure depicted in FIG. 4 and the remote vehicle angle authentication depicted in FIG. 5, or a combination of both, may be employed by the host vehicle 100 to detect V2V misbehavior upon receipt of the plurality of messages 130 using V2V communications. For example, in FIG. 1A, where the received messages 130 indicate that a remote vehicle 110 is traveling toward the host vehicle 100 at a speed of 20 m/s, either of the remote vehicle frequency shift authentication or the remote vehicle angle authentication could be used to determine that the messages 130 are actually being transmitted by an attacker 120 located on the side of the roadway. If employing the remote vehicle frequency shift authentication, for instance, whereas the messages 130 indicate remote vehicle 110 is purportedly traveling toward the host vehicle 100 at a speed of 20 m/s, the host vehicle 100 can determine that the actual source of the messages 130 (i.e., attacker 120) is stationary, according to a measurement of the actual change in frequency of the received messages 130 resulting from the Doppler effect (there would be no change in frequency). In other words, the host vehicle 100 is expecting a frequency change in the carrier waves of the messages 130 because the remote vehicle 110 is broadcasting that it is moving. However, utilizing the Doppler effect, the attacker's carrier waves indicate that the source is actually stationary.

In FIG. 1B, where the received messages 130 indicate that the remote vehicle 110 is stationary, either of the remote vehicle frequency shift authentication or the remote vehicle angle authentication could again be used to determine that the messages 130 are actually being transmitted by an attacker 120 located on the side of the roadway. This scenario may be slightly more difficult to detect than that of FIG. 1, since both the remote vehicle 110 and attacker 120 are stationary. Thus, the remote vehicle angle authentication may be more effective in such a case, as there is a detectable angular difference between the transmission points of the expected remote vehicle 110 and the location of the actual DSRC transmissions 130 coming from the attacker 120 on the side of the road.

In FIG. 1C, where the received messages 130 indicate that the remote vehicle 110 is again stationary, and there are multiple host vehicles 100 traveling on the roadway, either of the remote vehicle frequency shift authentication or the remote vehicle angle authentication could again be used to detect V2V misbehavior. Notably though, having multiple vehicles (e.g., host vehicles 100) traveling on the roadway simultaneously makes it very difficult for the attacker 120, since the attacker 120 would need to predict all host vehicle 100 locations within a given radius (e.g., 800 m) on a frequently recurring basis (e.g., every 100 ms). Furthermore, the attacker 120 would need to utilize one perfectly accurate directional antenna for every host vehicle 100 in range to mask the other host vehicles from diagnosing the V2V misbehavior.

Accordingly, techniques are described herein that provide enhanced security from attackers trying to emulate a vehicle. These benefits can be achieved with little additional cost because no additional sensors or hardware is required. Also, V2V technology is expected to eventually be standard equipment on all vehicles sold in North America. However, with greater interconnectivity, there is greater risk of harm in the case of a security breach. Thus, the techniques described herein for bolstering V2V security against particular malicious attacks are highly beneficial.

While there have been shown and described illustrative embodiments that provide for detecting misbehavior in V2V communications, it is to be understood that various other adaptations and modifications may be made within the spirit and scope of the embodiments herein. For instance, V2V communications and BSM standards will continue to evolve over time, and the security measures disclosed herein should not be treated as tied to only a particular version of V2V communications and BSMs. In other words, the scope of the present disclosure is intended to encompass all future implementations of V2V communications and BSM. The embodiments of the present disclosure may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising: receiving, at a host vehicle, a plurality of messages transmitted using Vehicle-to-Vehicle (V2V), wherein the plurality of messages are Basic Safety Messages (BSM) with a part for core safety data and a part for optional safety data; determining a heading angle and a speed of a remote vehicle according to the plurality of messages received using V2V communications; calculating an expected change in frequency of the plurality of messages received at the host vehicle based on the heading angle and the speed of the remote vehicle determined according to plurality of messages received using V2V communications; measuring an actual change in frequency of the plurality of messages received at the host vehicle due to the Doppler effect; comparing the expected change in frequency to the actual change in frequency; determining that the plurality of messages were not transmitted from the remote vehicle when a difference between the expected change in frequency and the actual change in frequency exceeds a predefined frequency change threshold; and performing automatic control of the host vehicle according to received V2V messages excluding the plurality of messages in response to determining that the plurality of messages were not transmitted from the remote vehicle.

2. The method of claim 1, further comprising:
counting a number of times that the difference between the expected change in frequency and the actual change in frequency exceeds the predefined frequency change threshold; and
determining whether the number of times exceeds a predefined event threshold.

3. The method of claim 1, further comprising:
calibrating one or more of the frequency change threshold and the number of times threshold.

4. The method of claim 1, further comprising:
determining a heading angle and a speed of the host vehicle.

5. The method of claim 4, wherein the expected change in frequency is calculated based on the heading angle and the speed of the remote vehicle and the heading angle and the speed of the host vehicle.

6. The method of claim 5, wherein the expected change in frequency is calculated according to the following formula:

$$\Delta f_{Calculated} = \frac{f}{c}|V_{RV} - V_{HV}| \cdot \text{Cos}(H_{RV} - H_{HV}),$$

where $\Delta f_{calculated}$ is the calculated expected change in frequency, f is a frequency of the plurality of messages received at the host vehicle, c is the speed of light, $V_{RV}$ is the speed of the remote vehicle, $V_{HV}$ is the speed of the host vehicle, $H_{RV}$ is the heading angle of the remote vehicle, and $H_{HV}$ is the heading angle of the host vehicle.

7. The method of claim 1, further comprising:
reporting that the plurality of messages were not transmitted from the remote vehicle.

8. The method of claim 1, further comprising:
determining that the remote vehicle is a virtual vehicle emulated by a remote attacker.

9. The method of claim 1, wherein the plurality of messages are Basic Safety Messages (BSMs).

10. A non-transitory computer readable medium containing program instructions for performing a method, the computer readable medium comprising: program instructions that receive, at a host vehicle, a plurality of messages transmitted using Vehicle-to-Vehicle (V2V) communications, wherein the plurality of messages are Basic Safety Messages (BSM) with a part for core safety data and a part for optional safety data; program instructions that calculate an expected change in frequency of the plurality of messages received at the host vehicle based on the heading angle and the speed of the remote vehicle determined according to the plurality of messages received using V2V communications; program instructions that measure an actual change in frequency of the plurality of messages received at the host vehicle due to the Doppler effect; program instructions that compare the expected change in frequency to the actual change in frequency; program instructions that determine that the plurality of messages were not transmitted from the remote vehicle when a difference between the expected change in frequency and the actual change in frequency exceeds a predefined frequency change threshold; and program instructions that perform automatic control of the host vehicle according to received V2V messages excluding the plurality of messages in response to determining that the plurality of messages were not transmitted from the remote vehicle.

* * * * *